United States Patent
Sato

(10) Patent No.: US 7,342,690 B2
(45) Date of Patent: Mar. 11, 2008

(54) METHOD AND APPARATUS FOR READING IMAGE

(75) Inventor: Tetsuya Sato, Mishima (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 1026 days.

(21) Appl. No.: 10/388,619

(22) Filed: Mar. 17, 2003

(65) Prior Publication Data

US 2004/0184118 A1    Sep. 23, 2004

(51) Int. Cl.
*H04N 1/00* (2006.01)
*H04N 1/04* (2006.01)

(52) U.S. Cl. .............. 358/471; 358/474; 358/497; 318/685; 318/696

(58) Field of Classification Search .......... 358/471, 358/474, 497, 486, 468; 318/685, 696
See application file for complete search history.

(56) References Cited

U.S. PATENT DOCUMENTS

| | | | | |
|---|---|---|---|---|
| 4,801,965 A | * | 1/1989 | Mochizuki et al. | 399/29 |
| 5,097,189 A | * | 3/1992 | Ito et al. | 318/685 |
| 5,216,225 A | * | 6/1993 | Muto et al. | 219/216 |
| 5,319,428 A | * | 6/1994 | Maruko et al. | 399/70 |
| 5,832,330 A | * | 11/1998 | Kiyoi | 399/33 |
| 7,019,481 B2 | * | 3/2006 | Kato et al. | 318/610 |

FOREIGN PATENT DOCUMENTS

| JP | 5-38193 A | | 2/1993 |
|---|---|---|---|
| JP | 05038193 A | * | 2/1993 |
| JP | 5-56690 A | | 3/1993 |
| JP | 5-100324 A | | 4/1993 |
| JP | 7-156491 A | | 6/1995 |

* cited by examiner

*Primary Examiner*—Cheukfan Lee
(74) *Attorney, Agent, or Firm*—Foley & Lardner LLP

(57) ABSTRACT

An image reading apparatus of the present invention can suppress an image distortion caused by the vibration of a carriage by varying at least one of the level of a current supplied to a drive motor in accordance with a variation of an environmental temperature and an acceleration distance.

7 Claims, 6 Drawing Sheets

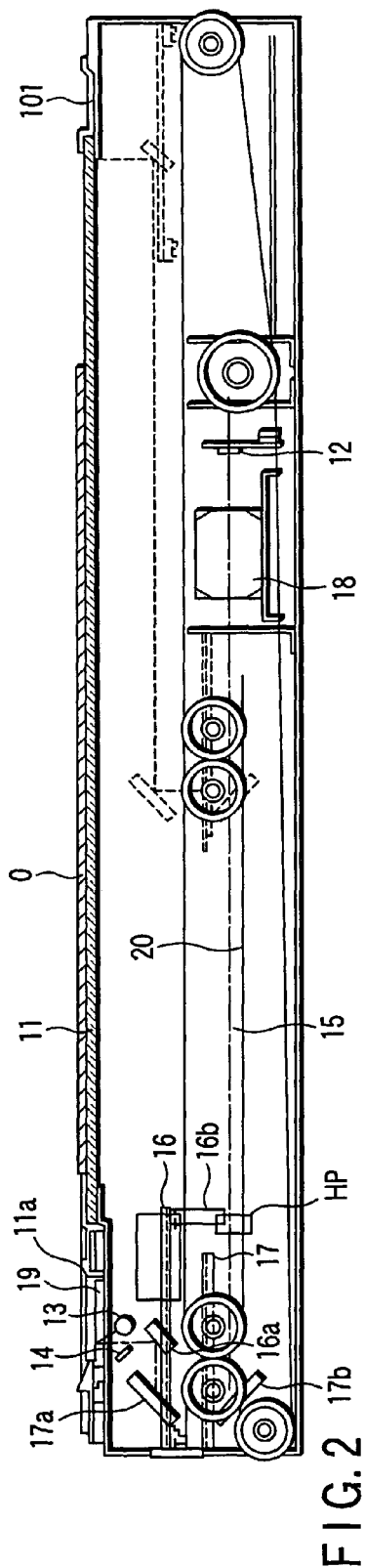
FIG. 2
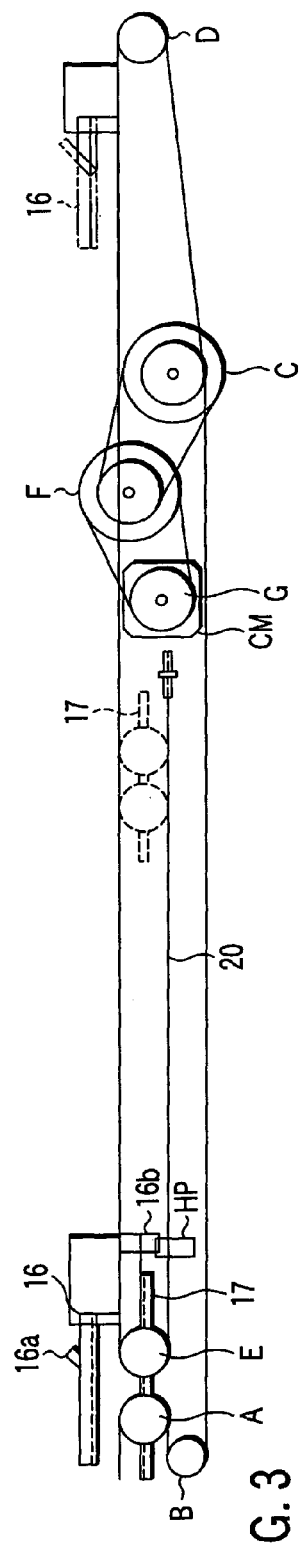
FIG. 3
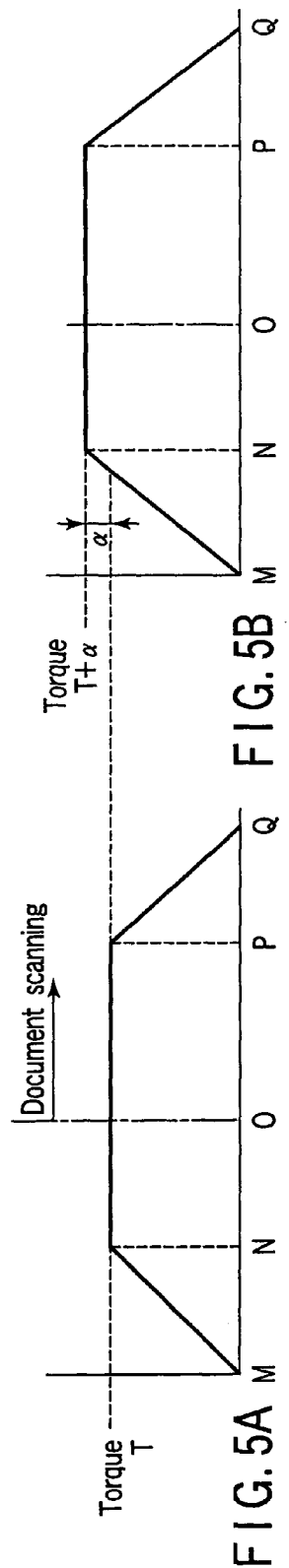
FIG. 5A
FIG. 5B

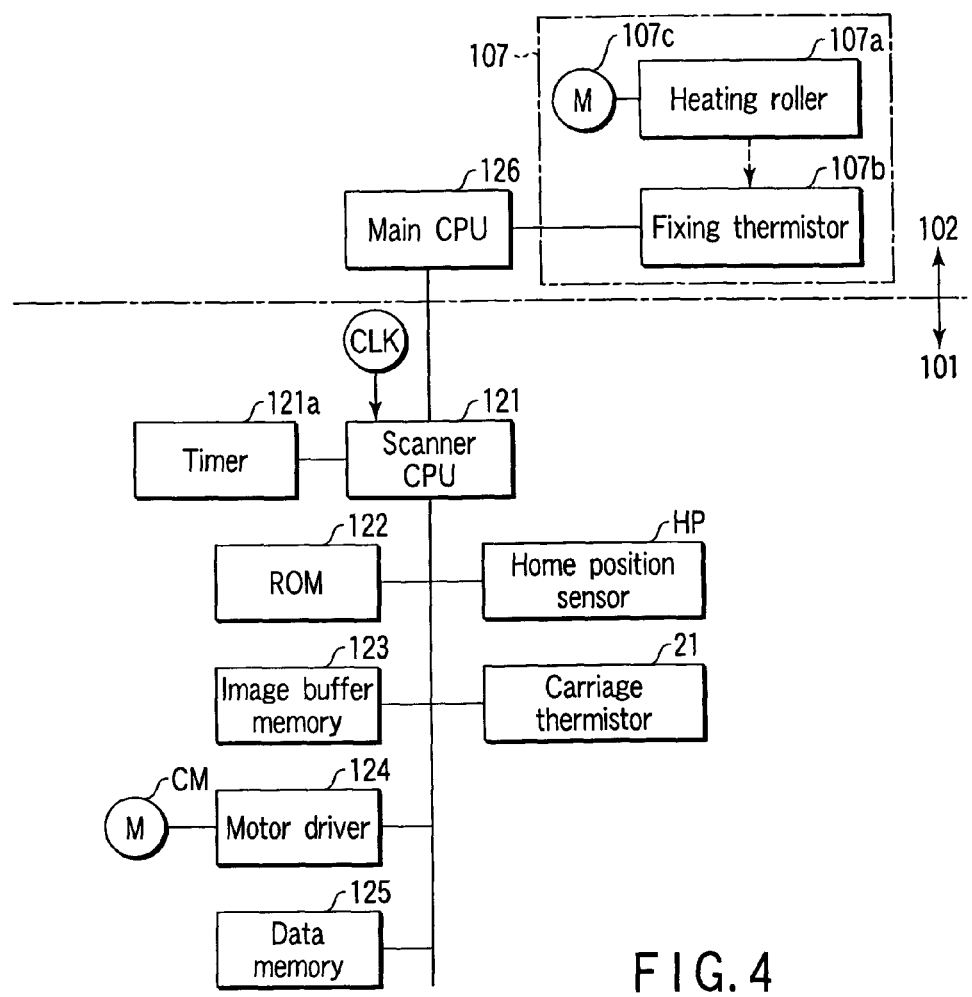
FIG. 4
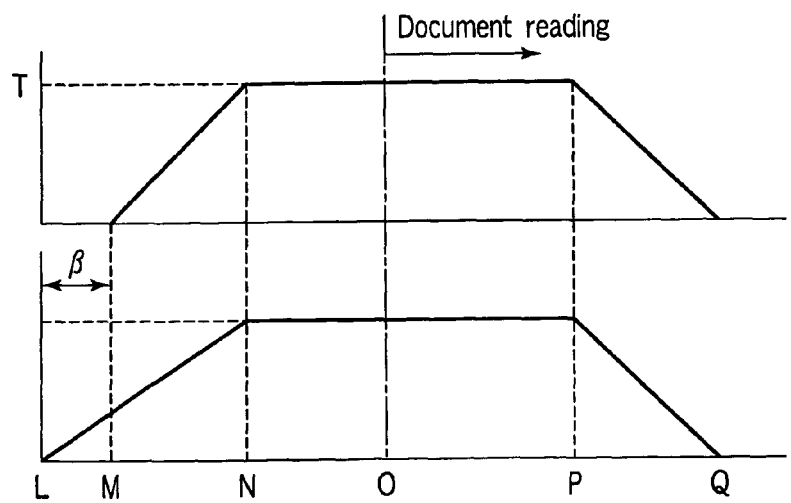
FIG. 6A
FIG. 6B

METHOD AND APPARATUS FOR READING IMAGE

BACKGROUND OF THE INVENTION

The present invention relates to an image reading apparatus for obtaining image data from a reading object for example and an image forming apparatus having its image reading apparatus.

An image scanner obtains image data by illuminating, with light, a reading object such as a sheet-like document, a book or a solid material and causing obtained reflected light to be photoelectrically converted by an image reading sensor.

The image reading apparatus comprises a document retaining section (document table) for retaining the reading object, an illumination unit including an illumination lamp and configured to illuminate, with the lamp, the reading object set on the document table, a line charge-coupled device (CCD) sensor serving as an image reading sensor, an optical set (a plurality of mirrors and image formation lens) provided between the document table and the CCD sensor to allow reflected light from the reading object to be image-formed on the CCD sensor, etc.

In the above-mentioned image reading apparatus, there are sometimes the cases where the temperature within the apparatus is cooled, for example, in a earlier hour such as in the morning and a belt for transmitting the rotation of the motor as well as a wire for moving the illumination unit is hardened, for example, in the winter and in the high latitude regions. Immediately after the power source is turned ON, therefore, a load on the motor is augmented in comparison with those other than the lower temperature environments (for example, an ordinary temperature environments).

If the motor is to be rotated as usual with the load augmented, the torque involved is relatively lowered so that the motor cannot be rotated smoothly.

When the illumination unit is moved with the torque in an insufficient state, there occurs a problem that a read-out image will be distorted due to a vibration of an illumination unit. In a back scanning for returning the illumination unit back to a standby position, there also occurs the problem that the illumination lamp, structure, etc., will be destroyed upon the impact of the illumination unit against the frame of the image reading apparatus.

In order to solve a relative, insufficient motor torque, a proposal has been made, for example, in Jpn. Pat. Appln. KOKAI Publication No. 5-100324 by which a motor drive current supplied at a lower temperature time (under the lower temperature environment) is more increased than usual (under the ordinary temperature environment).

It is suggested that, in Jpn. Pat. Appln. KOKAI Publication No. 5-38193, the circumferential temperature is detected and, based on the temperature, the level of the motor drive current is returned back to a normal state.

The level of the motor drive current is set to include an allowance even at a normal operation time so that it may be less affected by a variation in power supply voltage and an unexpected disturbance.

If the level of the motor drive current supplied to the motor is set to include any excessive allowance of an extent not required even at other than a lower temperature environment, the motor is sometimes vibrated. The vibration generated in the motor is transmitted by a belt or wire to the illumination unit and there occurs a problem that any read-out image is distorted. It is to be noted that, when the current supplied to the motor and motor drive circuit becomes greater than a predetermined level, the noise is increased each time the current is supplied. Further, the motor drive current including any excessive allowance simply increases dissipation power.

BRIEF SUMMARY OF THE INVENTION

The object of the present invention is to provide an image reading apparatus and image forming apparatus which can read a distortionless image irrespective of an operation environment involved.

In one aspect of the present invention, an image reading apparatus is provided, comprising a carriage mechanism configured to support a light source and at least one mirror in a way to be movable at a predetermined speed; a motor configured to move the carriage; a motor drive mechanism configured to supply a motor current to the motor; a condition detecting mechanism for detecting a condition for varying the level of the motor current under a predetermined condition; and a motor drive mechanism control section (CPU) configured to be able to vary the magnitude of the motor current supplied from the motor drive mechanism to the motor on the basis of the generation of that event detected by the detecting mechanism.

In another aspect of the present invention an image forming apparatus is provided, comprising a carriage mechanism configured to support a light source and at least one mirror in a way to be movable at a predetermined speed; a motor configured to move the carriage member; a motor drive mechanism configured to supply a motor current to the motor; condition detection mechanism for detecting a condition for varying the magnitude of the motor current under a predetermined condition; a CCD sensor configured to convert, to image data, light which is reflected from a reading object illuminated with light coming from the light source; a light exposure device configured to output light whose intensity varies responsive to the image data obtained from the CCD sensor; an image carrier configured to allow a latent image to be formed thereon with light from the light exposure device; a developing device configured to supply a toner to a latent image on the image carrier to make the latent image visible; and a fixing device configured to fix that visible image to a to-be-fixed material.

In a still another object of the present invention, a motor drive method comprising: a step of, when a carriage movably supported on a motor is moved, detecting a predetermined condition under which a drive force suited to an environmental temperature of an image reading apparatus can be supplied; a step of, based on a result of detection, supplying a motor current to allow the carriage to be operated in a way suitable to the environmental temperature; and a step of supplying a second motor current of a predetermined level after a first motor current based on the result of detection is supplied for a predetermined time.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a diagrammatic view for explaining one example of an image forming apparatus (scanner) incorporated into the copying apparatus shown in FIG. 1;

FIG. 3 is a diagrammatic view for explaining one example of a drive mechanism configured to move an illumination unit along a document table in an image forming apparatus shown in FIG. 2;

FIG. 4 is a diagrammatic block diagram for explaining one example of a control system for the image scanner and image forming apparatus shown in FIGS. 1 to 3;

FIGS. 5A and 5B, each, are a graph for explaining a relation of a motor's output torque to a position (moving amount) of the illumination unit;

FIGS. 6A and 6B, each, are a graph for explaining a relation of a motor's output torque to a position (moving amount) of the illumination unit;

DETAILED DESCRIPTION OF THE INVENTION

Figure 1:
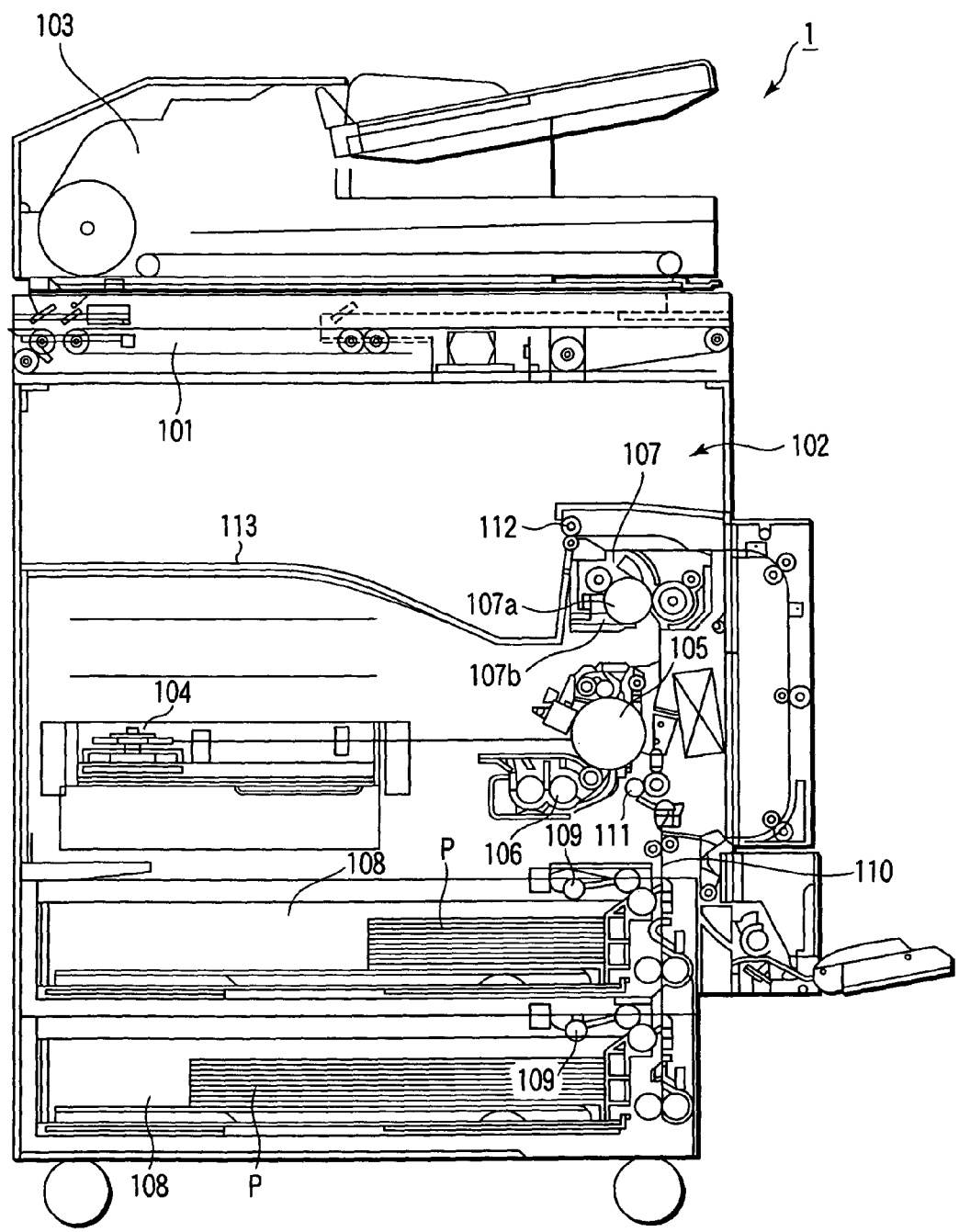
FIG. 1 is a diagrammatic view for explaining one example of a copying apparatus including an image forming apparatus of the present invention.

With reference to the drawing, an explanation will be made below about an example of an image forming apparatus to which an example of an image reading apparatus according to one embodiment of the present invention is applicable. Here, the example of the embodiment will be explained below by taking a digital copying apparatus as an example.

As shown in FIG. 1, a digital copying apparatus 1 includes a scanner (image reading apparatus) 101 and an image forming section 102. In the case where a copying object is a sheet-like one, an automatic document feeding apparatus (ADF) 103 is provided integral with a scanner 101 to sequentially set a copying object in accordance with the operation for reading out image information from the copying object.

The image forming section 102 has a light exposure device 104, a photosensitive drum 105, a developing device 106, a fixing device 107, etc.

In the above-mentioned digital copying apparatus 1, a light intensity varying laser beam corresponding to image information is directed from the light exposure device 104 onto an outer peripheral surface of the photosensitive drum 105 which is charged with a predetermined potential.

By doing so, an electrostatic image corresponding to a to-be-copied image, that is, an electrostatic latent image, is formed on the photosensitive drum 105 at a predetermined position.

The electrostatic latent image, not shown, which is formed on the photosensitive drum 105 is developed only at the light image area by being selectively supplied with a toner not shown, that is, a toner coming from the developing device 106. The toner image, not shown, formed on the surface of the photosensitive drum 105 is transferred to a sheet P coming from a sheet cassette 108 at a transfer position opposite to a transfer device not shown with a reference numeral.

Sheets P are taken one by one from the sheet cassette 108 by means of a pick-up roller 109 and conveyed along a conveying path 110 toward the photosensitive drum 105.

The sheet P which is conveyed on the conveying path 110 is once stopped so as to allow a toner image bearing sheet P which is retained on the photosensitive drum 105 to be aligned in position to a position of an image on a reading object by an aligning roller 111 and, after being matched in timing, guided to an opposed transfer position between transfer device not shown and the photosensitive drum 105.

The toner, not shown, which is transferred to the sheet P is conveyed onto the fixing device 107 where it is attached or fixed to the sheet. A thermistor 107b is provided on a predetermined position of the fixing device 107 to detect the temperature on the outer peripheral surface of a heating roller 107a for example.

A sheet P with a toner image not shown, that is, a copied image corresponding to an image of a reading object or an output image corresponding to image information (supplied from an external device) being fixed by the fixing device 107 is delivered by a delivery roller 112 into a defined space between the scanner 101 and a sheet cassette 108, that is, into an image output medium retaining section (tray) 113.

FIG. 2 is a view for generally showing one example of an image scanner incorporated into a copying apparatus as shown in FIG. 1.

As shown in FIG. 2, the image scanner 101 has a document table 11 made of a light transmitting material typical of glass, etc., and having a generally uniformly thick plate-like flat body. The document table 11 holds a reading object O in place. In the case where the reading object O is sheet-like, the ADF 103 is used by which the reading object O is set in a one by one fashion each time the reading-out of a reading object O placed on a document table 11 is completed. Further, herein, the reading object O is referred to as a document O assuming that the reading object O is sheet-like.

Below the document table 11 and at a predetermined location in the image scanner 101, a photoelectric conversion element (CCD sensor) 12 is provided for converting image information of the document O to an electric signal. The image information of the document O set on a reading station of the document table 11 is transmitted through a plurality of mirrors as will be set out below.

Below the document table 11 and in a space along the document table, an illumination lamp 13 is provided for radiating light toward the document table 11 and a reflector 14 is provided for allowing light which is radiated from the illumination lamp 13 to be collected onto the document table 11 at a predetermined place. The illumination lamp 13 and reflector 14 are fixed to a first carriage 16 which is reciprocable along the surface of the document table 11 by being moved on a rail.

An image picking-up mirror 16a is provided at the first carriage 16 to allow light coming from the document O and reflected on the reflector 14 after leaving the illumination lamp, that is, image information of the document O, to be guided in a predetermined direction. It is to be noted that, here, the reflected light originating from the document O is referred to as the image light.

A second carriage 17 is provided for allowing a movement to be made to follow the first carriage 16 near the first carriage 16 in a direction to let image light which is captured by the image picking-up mirror 16a to be reflected after coming from the document O. The second carriage 17, though being explained in a subsequent stage with the use of FIG. 3, is moved by a wire 20 in a predetermined positional relation to the first carriage 16. Further, the first carriage 16 and second carriage 17, though being explained at a subsequent stage with the use of FIG. 3, are moved on a rail 15 by rotating the motor CM.

First and second image mirrors 17a and 17b are provided relative to the second carriage 17 to allow the image light coming from the image picking-up mirror 16a to be bent at 90° each.

The image light which is reflected by a second image mirror 17b is guided to a lens 18 and it is given a predetermined image-forming magnification and image-formed onto a CCD sensor 12 arranged at a focal position of the lens 18.

It is to be noted that, in the case where an image contained in the document O is illuminated, the image information of the document O can be grasped as the light/dark beam resulting from the difference in reflection factor between the non-image portion and the image portion. By converting the light/dark beam corresponding to image information of the illuminated document O to an electric signal by means of the CCD sensor 12 it is possible to obtain image data corresponding to the image information of the document O.

A size plate 11a is provided at one end portion of the document table 11 so as to exhibit a reference position when the document O is set to the document table 11.

A whiteboard 19 is provided at the back surface of the size plate 11a, that is, at the first and second carriage (16 and 17) side surfaces, so as to input a white level reference value when the CCD sensor 12 effects a photoelectric conversion of an image of the document O. It is not necessarily required that the whiteboard 19 be provided at the back surface of the size plate 11a. And the whiteboard may be arranged at a predetermined location more on the outer peripheral edge portion of a housing of the image scanner 101 where the first and second carriages 16 and 17 are set in the standby state and more on the forward end portion (forward end portion of the reading object O) of the document table 11.

In a space along the document table 11 below the document table 11, for example, below the rail 15, a thermistor 21 is arranged at such a location as not to prevent the movement of first and second carriages 16 and 17. The thermistor 21 detects the temperature in the image scanner 101. It is to be noted that the thermistor 21 may be provided on or near the outer wall of the motor CM as will be explained below in connection with FIG. 3 for example.

In a predetermined position of at least one of the first and second carriages 16 and 17 (Here, an explanation will be made below in connection with the first carriage 16), a switch plate 16b is mounted to enable the present position of the first carriage 16 to be detected by a home position sensor HP as will be explained below. The switch plate 16b is typical of a longitudinal end, etc., of the image picking-up mirror 16a for example and is provided at an area not affecting image light when the first and second carriages 16 and 17 are moved on the rail 15.

The home position sensor HP is provided, for example, on a not-detailed frame of the image scanner 101 or at a predetermined place near the rail 15 and detects the passing of the switch plate 16b or its arrival. Based on a time point at which the home position sensor HP detects the passing of the switch plate 16b or its arrival, the number of motor drive pulses inputted to the motor CM (see FIG. 3) is counted and, by doing so, it is possible to detect an amount (present position) of movement of the first carriage 16 and second carriage 17.

FIG. 3 is a schematic diagram for explaining a drive mechanism for allowing the first carriage and second carriage 17 of the image scanner shown in FIG. 2 to be reciprocably moved along the document table.

As shown in FIG. 3, the first carriage 16 and second carriage 17 of the image scanner 101 have the rotation of the drive motor CM transmitted by a wire 20 and are moved along the document table 11 at a predetermined speed corresponding to an initially set reading magnification.

By way of example, the wire 20 is run from a fixed end of the not-detailed frame side, wrapped around a pulley A of the second carriage 17 to turn its direction back, then around a fixed pulley B to turn its direction once more, and wrapped with any given few turns around a fixed pulley C to which the rotation of the drive motor CM is transmitted and then around a pulley D on the other side to turn its direction back, and, after being wrapped around a pulley E of the second carriage 17, fixed. It is to be noted that the pulley C is comprised of a speed reducing pulley and configured to be rotated at a predetermined speed by the rotation of a motor pulley G which is provided on a shaft of the drive motor CM speed-reduced through, for example, a transmission element such as a toothed belt and not-detailed intermediate speed reducing pulley F.

Further, the first carriage 16 is fixed to the wire 20 between the pulley E and the pulley D provided on the frame.

Thus, the second carriage 17 is moved at a ½ speed of the first carriage 16 over a distance one half the distance of the movement of the first carriage 16.

FIG. 4 is a block diagram generally showing one example of a control system of the image forming apparatus of the present invention.

The scanner 101 has a motor driver 124 for supplying a motor drive current for driving the drive motor CM at any given torque in a predetermined rotation direction. The motor driver 124 is connected to a scanner CPU 121 for controlling the scanner 101.

To the scanner CPU 121 are connected a ROM 122 for initially storing an operation program of the scanner CPU 121, a buffer memory 123 for holding image data outputted through the photoelectric conversion by a CCD sensor 12, and a data memory 125 for storing a decision reference as will be set out below.

To the scanner CPU 121 are connected the home position sensor HP, thermistor 21, a clock generation section CLK for generating a reference clock, and so on. A timer 121a is further connected to the scanner CPU 121 to count the reference clock generated from the clock generation section CLK. The timer 121a is utilized to count a time until, for example, the fixing thermistor 107b detects a predetermined temperature. It is to be noted that, in place of the timer 121a, a time keeping mechanism may be provided to make a predetermined time retainable (for fixing by the fixing device 107).

On the other hand, the scanner CPU 121 is connected to a main CPU 126 on the image scanner 102 side through an interface, not shown. To the main CPU 126 are connected the fixing thermistor 107b, a fixing motor 107c for rotating the heating roller 107a of the fixing device 107 though being not set out in detail, and so on.

Now a detailed explanation will be made below about controlling the drive motor CM constituting the feature of the present invention.

FIGS. 5A and 5B are graphs for explaining a relation, to the position (movement amount) of the illumination unit, of a torque outputted from the motor to move the first and second carriages, that is, the illumination unit, along the document table.

In FIGS. 5A and 5B, the abscissa axis shows the present position (movement amount) of the first carriage 16. The position M represents an initial position set based on the detection of the home position sensor HP and the position N represents a position at which the first carriage is to be moved at a uniform speed after the acceleration of the motor CM. In this connection, the rotation of the motor will be explained below in terms of the movement amount of the first carriage 16. In FIGS. 5A and 5B, the ordinate axis shows the torque because the torque outputted by the drive motor CM is proportional to a supply current from the motor driver.

In a normal environment, as shown in FIG. 5A, the first carriage 16 located at an initial position M is accelerated by the rotation of the motor CM until reaching the position N. During this period, the torque outputted from the motor CM is gradually increased up to a torque T. Though being not set out in more detail, the motor drive current supplied from the motor driver 124 to the motor CM is maintained to a predetermined magnitude after an elapse of a fixed time (a time set for the first carriage from the position M to the position N) at which the torque generated from the motor CM is assumed to reach the torque T.

Thus, the first carriage 16 is moved at a fixed speed from the position N-passing time point along the document table 11 to a position P (end position of the document O) and decelerated toward the position Q (the stopping position for turning back). It is to be noted that, in front of the document reading point O, the lamp 13 is lit at a predetermined timing.

As shown in FIG. 5B, in the lower temperature environment, due to an increase in torque resulting from a variation, etc., of the belt and wire, the current magnitude supplied to the motor CM is increased so that a torque greater by a magnitude α than a torque T in the normal temperature environment as explained with the use of FIG. 5A can be outputted. That is, the current value supplied from the motor driver 124 to the motor CM is increased so as to output a torque T+α in comparison with the normal temperature environment. By doing so, the first carriage 16 accelerated from the initial position M is accelerated so that it can be moved at a speed substantially equal to that of the normal temperature environment until reaching the position N.

FIGS. 6A and 6B show another example of control under which the illumination unit as set out in connection with FIGS. 5A and 5B is moved along the document table. It is to be noted that FIG. 6A is an example of the normal temperature environment prepared so as to distinguish it from FIG. 6B and that any further explanation is omitted because the graphs of these Figures are the same as that of FIG. 5A.

As shown in FIG. 6B, the first carriage 16 is moved from an initial position M back to a position L with the reading point O as a start and accelerated at an increased acceleration distance (L-M-N interval). That is, the first carriage 16 is accelerated at an increased acceleration distance L-M (β) as an acceleration distance. This is equivalent to the suppression of the acceleration upon comparison with the normal circumstance and shows that, even if the belt and wire are hardened, the transmission of a vibration to the illumination unit (first and second carriages) is lowered.

Figure 7:
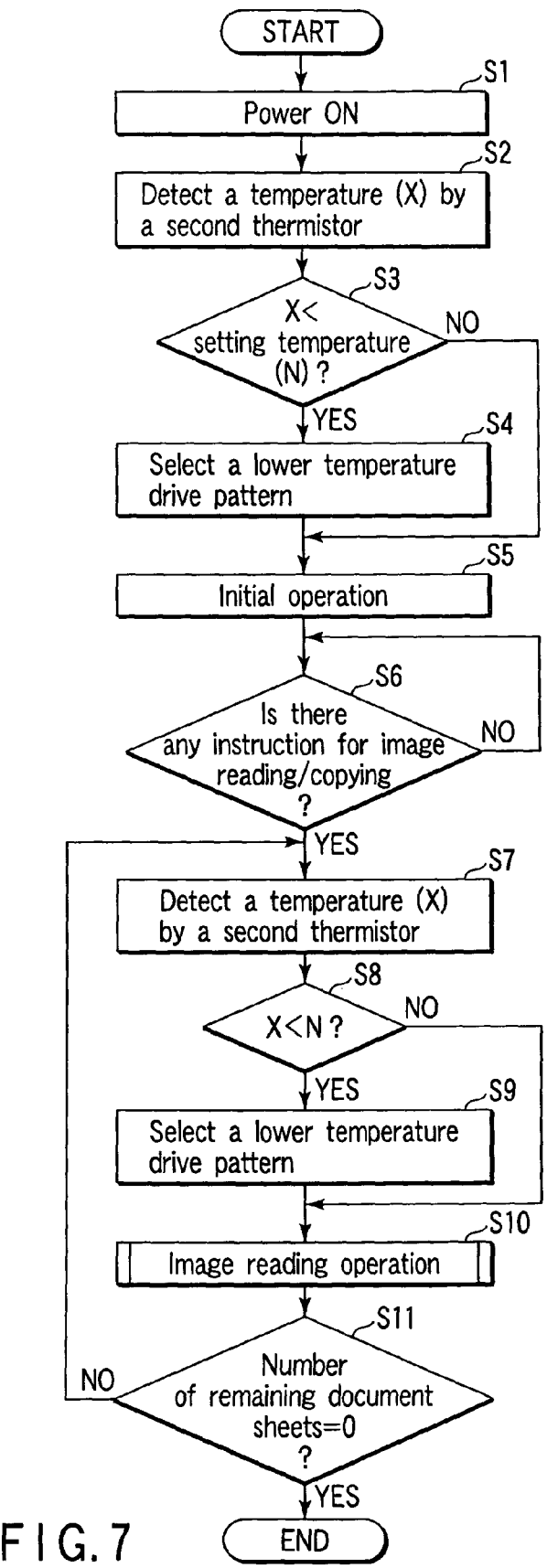
FIG. 7 is a flow chart for explaining one example of an operation of the image reading apparatus shown in FIGS. 2 and 3.

FIG. 7 shows a flow chart for explaining, in more detail, one example of control of the copying device shown in FIG. 1 and an image scanner shown in FIGS. 2 and 3.

As shown in FIG. 7, when a power supply switch, not shown, of the copying apparatus is turned ON (S1), a temperature X detected by the thermistor 21 is taken into the scanner CPU 121 (S2). The temperature X detected at step S2 is compared with a setting temperature N stored in a data memory 125 (S3). It is decided whether a lower temperature drive pattern is to be applied as lower temperature environment (S3-YES) or a normal condition (ordinary temperature environment) is involved (S3-NO). It is to be noted that the setting temperature N is set to, for example, 10° C. and that the state is set to be a lower temperature environment if the setting temperature is, for example, below 10° C. and to be ordinary temperature environment if the setting temperature N exceeds 10° C.

In the case where, at step S3, it is decided that the lower temperature environment is involved (S3-YES), the driving of the motor CM under a lower temperature condition stored in the data memory 125 as shown in FIG. 5B (the driving under more current than a current set under the ordinary condition considering an increased load under the lower temperature environment) is instructed from the scanner CPU 121 to the motor driver 124. Thus, at a monument for detecting the home position of the first and second carriages 16 and 17 as one of the initial motions, the motor CM is rotated at a torque T+α to allow the first and second carriages 16 and 17 to be moved at a constant speed along the document table 11 (S4).

In the case where it is decided at step S3 that the normal condition is involved (S3-NO), the driving of the motor CM under the normal condition as shown in FIG. 5A is instructed from the scanner CPU 121 to the motor driver 124. In this case, the motor CM is rotated at a torque T to allow the first and second carriages 16 and 17 to be moved at a constant speed along the document table 11 (S5).

Here, in accordance with a known initial program, the first and second carriages 16 and 17 are so set that, for example, the first carriage 16 is stopped to a position satisfying a predetermined positional relation with a predetermined position, that is, a position of the home position sensor HP, as a reference (ready).

When the reading/copying of the document O is instructed from the operational panel not shown (S6-YES), a temperature X detected by the carriage thermistor 21 is again checked by the scanner CPU 121 (S7).

The temperature X detected at step S2 is compared with the setting temperature N stored in the data memory 125 (S8), and it is decided whether the lower drive pattern is still to be applied (S8-YES) or the normal condition is involved (S8-NO).

In the case where it is decided at step S8 that the lower temperature drive pattern is to be applied (S8-YES), the driving of the motor CM under the lower temperature condition stored in the data memory 125 as shown in FIG. 5B is instructed from the scanner CPU 121 to the motor driver 124 (S9). Thus, the drive motor CM is rotated at a torque T+α to allow the first and second carriages 16 and 17 to be moved at a constant speed along the document table 11.

In the case where it is decided at step S8 that the normal condition is involved (S8-NO), the driving of the motor CM under the normal condition as shown in FIG. 5A is instructed from the scanner CPU 121 to the motor driver 124. Thus, the drive motor CM is rotated at a torque T to allow the first and second carriages 16 and 17 to be moved at a constant speed along the document table 11 (S10).

As set out below, checking is made to see whether or not any further image reading/coping is to be made (S11) and, if there exists any remaining object, steps S7 to S10 are repeated.

Figure 8:
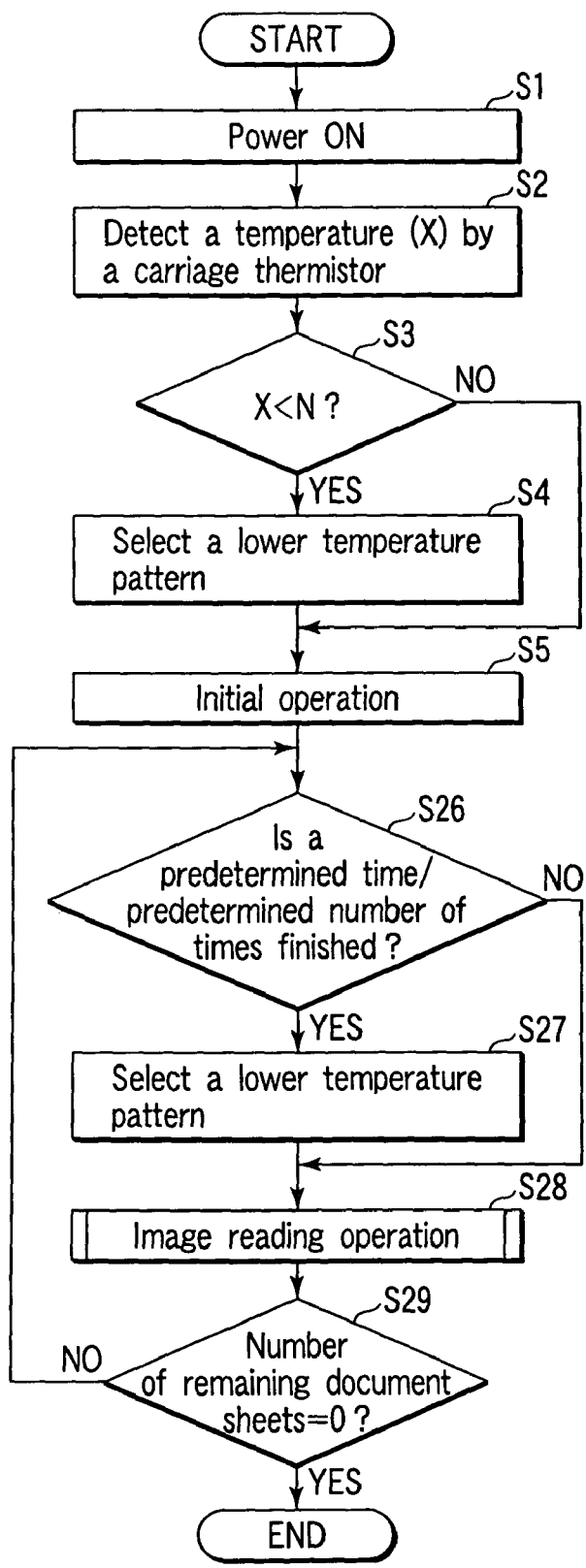
FIG. 8 is a flow chart for explaining one example of an operation of the image reading apparatus and image forming apparatus shown in FIGS. 1 to 3.

FIG. 8 is a flow chart showing an operation pattern different from the operation pattern shown in FIG. 7.

In FIG. 8, steps S1 to S5 are the same as set out above in connection with FIG. 7 and any further explanation will be omitted.

If, at step S5, the image reading/copying is instructed with the initial operation of the image scanner 101 finished, the temperature of the heating roller 107a of the fixing device 107 which is detected by the fixing thermistor 107b is checked by the scanner CPU 121. And it is decided whether or not the temperature of the heating roller 107a reaches a temperature at which a toner image can be fixed to the sheet P, that is, whether or not warming-up is finished (S26).

In the case where, at step S26, the warming-up is finished (S26-YES), a result of counting by a timer 121a is used and a time (warming-up time) Y taken for the fixing device 107 to reach a fixing temperature at which the toner image can be fixed to the sheet P is detected by the scanner CPU 121 (S28).

Comparison is made between a result of detection Y by the timer 121a and a timer setting value T stored in the data memory 125 and, in connection with a state in which a lower temperature drive pattern is still to be applied (S28-YES), the driving of the motor CM under the lower condition stored in the data memory 125 as shown in FIG. 5B is instructed from the scanner CPU 121 to the motor driver 124 (S29).

In the case where it is decided at step S28 that the normal condition is involved (S28-NO), the normal condition is retained.

In the case where a copying image formation is instructed subsequent to the image scanning, image information of a document O set on the document table 11 is scanned by the image scanner 101 and copied by the image forming section 102 (S30).

Checking is made to see whether or not any further image reading/copying is to be made (S31) and, if there exits any remaining object, the process of steps S27 to S30 is repeated.

Figure 9:
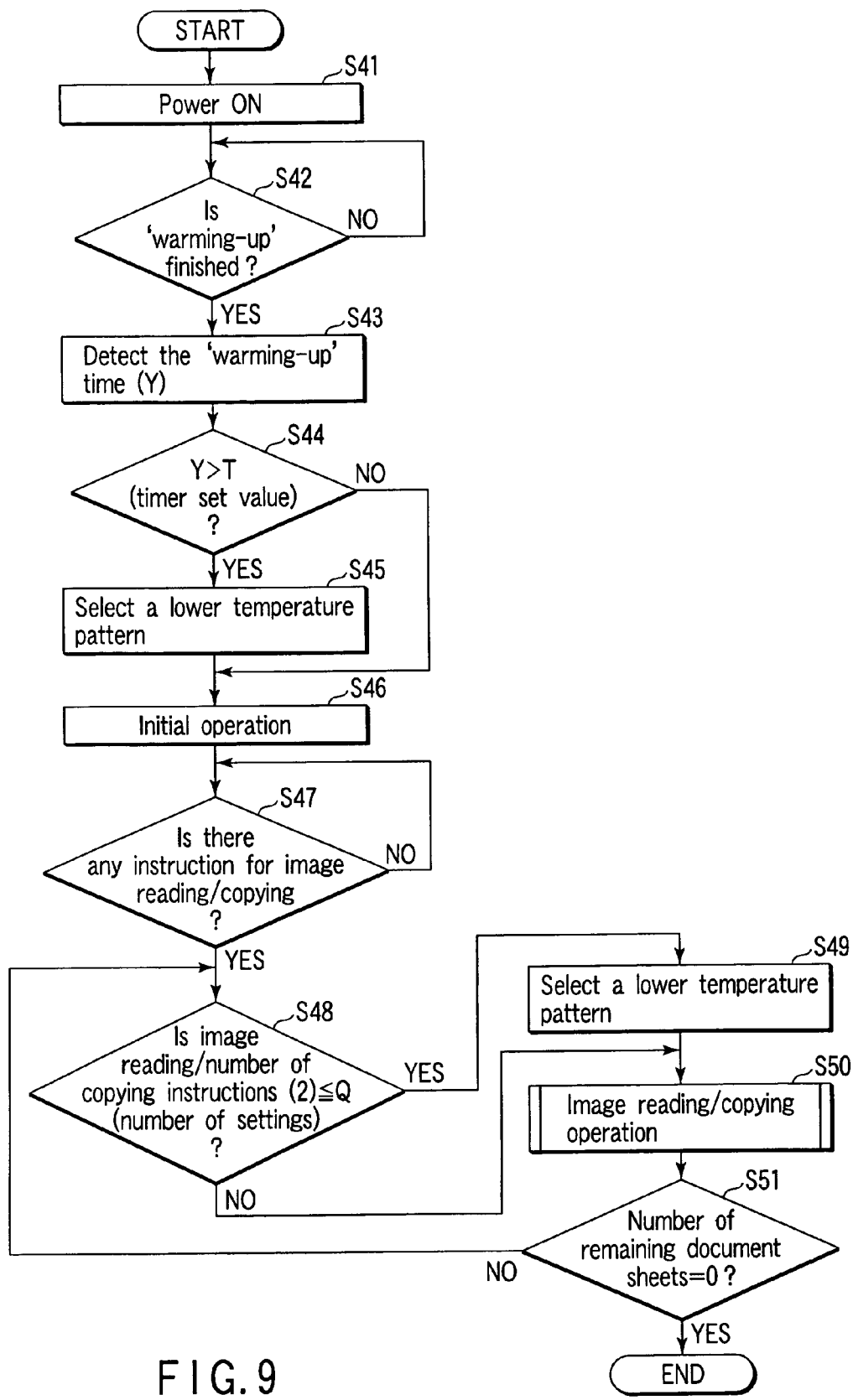
FIG. 9 is a flow chart for explaining one example of an operation of the image reading apparatus and image forming apparatus shown in FIGS. 1 to 3.

FIG. 9 is a flow chart showing one example of another operation of an image scanner/copying apparatus shown in FIGS. 7 and 8. It is to be noted that, in FIG. 9, an initial operation of the image scanner 101 is started after the warming-up of the fixing device 107 of the image forming device 102.

When a power supply switch, not shown, of the copying apparatus 1 is turned ON as shown in FIG. 9-S41, the temperature of the heating roller 107a of the fixing device 107 which is detected by the fixing thermistor 107b is checked by the scanner CPU 121 and it is decided whether or not the temperature of the heating roller 107a reaches a temperature at which a toner image can be fixed to a sheet P, that is, whether or not the warming-up is completed (S42).

In the case where, at step S42, the warming-up is finished (S42-YES), a result of count by the timer 121a is referred to and a time (warming-up time) Y taken for the fixing device 107 to reach a fixing temperature at which a toner image can be fixed to a sheet P is detected by the scanner CPU 121 (S43).

Comparison is made between a result of detection, Y, by the timer 121a and a timer's setting value T stored in the data memory 125 and it is decided whether the lower temperature drive pattern is still to be applied (S44-YES) or the normal condition is involved (S44-NO).

In the case where, at step S44, it is decided that a lower temperature environment is involved (S44-YES), the drive of the motor CM under a low temperature condition stored in the data memory 125 as shown in FIG. 6B is instructed from the scanner CPU 121 to the motor driver 124. Thus, the motor CM is reverse-rotated to allow the first and second carriages 16 and 17 to be accelerated over an augmented acceleration distance (L-M-N interval) and is rotated at a torque T to allow the carriages 16 and 17 to be moved at a constant speed along the document table 11 (S45).

In the case where the normal condition is involved (S44-NO), the drive of the motor CM under the normal condition is instructed from the scanner CPU 121 to the motor driver 124 (S46).

When the reading/copying of the document O is instructed from the operation panel not shown (S47-YES), comparison is made between the number of times (sheets) Z the reading/copying of an image is repeated by the digital copying apparatus after the turning ON of a power source and any number of times (sheets) Q both being counted by a counter, not shown, etc., prepared as a firmware for the main CPU 126. And it is decided whether the lower temperature drive pattern is still to be applied (S48-YES) or a normal condition is involved (S48-NO) by step S48. It is to be noted that the number of times Q is initially set, or set by the user from the operation panel, not shown, so as to be able to secure a predetermined temperature in the image scanner 101.

In the case where it is decided that an instruction is for the image reading/copying under a lower temperature condition (S48-YES), the driving of the motor CM under a lower temperature condition stored in the data memory 125 as shown in FIG. 6B is instructed from the scanner CPU 121 to the motor driver 124. Thus, the motor CM is reverse rotated to allow the first and second carriages 16 and 17 to be accelerated over an augmented acceleration distance (L-M-N interval) and is rotated at a torque T to allow the carriage to be moved at a predetermined speed along the document table 11 (S49).

In the case where it is decided that the normal condition is involved (S48-NO), the driving of the motor CM under the normal condition stored in the data memory 125 is instructed from the scanner CPU 121 to the motor driver 124.

In the case where an image formation is instructed subsequent to the reading of the image, the image information of the document O set on the document table 11 is scanned by the image scanner 101 and copied by the image forming section 102 (S50).

Then, checking is made to see whether or not any further image reading/copying is to be made (S51), that is, if there is any remaining object and the recess of steps S48 to S50 is repeated.

Although, in FIGS. 7 and 8, the output torque of the drive motor is controlled by way of example by judging the environment temperature (the value of the current supplied from the motor driver is augmented under the lower temperature environment) as shown in FIG. 5B, the present invention is not restricted thereto and the condition as explained in connection with FIG. 9 is also applicable. Although, in the example shown in FIG. 9, the acceleration distance of the drive motor is varied by way of example by judging the environmental temperature, the present invention is not restricted thereto and the condition as explained in connection with FIGS. 7 and 8 can also be applied.

In the image scanner of the present invention, as explained above, the carriage, that is, an image information picking-up section comprising an illumination unit and mirrors, is moved along the document table without causing any unwanted vibration. It is, therefore, possible to convert the image information to image data without causing any distortion.

Further, the drive control under a lower temperature environment is stopped at a predetermined timing by various parameters such as the temperature condition, the number of times the image is read out (formed), or a time required to warm up the fixing device of the image forming apparatus and this is done without involving any unwanted increase in dissipation power. This involves neither any noise resulting from an eddy current nor any increase in dissipation power.

The present invention is not restricted to the above-mentioned respective embodiments and various changes or modifications of the present invention can be made at a practical stage without departing from the essence of the present invention. Further, the respective embodiments may be reduced to practice under as various combinations of these as possible.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming apparatus, comprising:
   a carriage mechanism configured to support a light source and at least one mirror in a way to be movable at a predetermined speed;
   a motor configured to move the carriage mechanism;
   a motor drive mechanism configured to supply a motor driving current to the motor;
   condition detecting mechanism configured to detect conditions for variation of the magnitude of the motor driving current under a predetermined condition;
   a charge-coupled device (CCD) sensor configured to convert, into image data, light which is reflected from a reading object illuminated with light coming from the light source;
   an exposure light device configured to output light whose intensity varies responsive to the image data obtained from the CCD sensor;
   an image carrier configured to allow a latent image to be formed thereon with the light from the light exposure device;
   a developing device configured to supply a toner to the latent image on the image carrier to make the latent image visible;
   a fixing device configured to fix that visible image to a to-be-fixed materials,
   a temperature sensor configured to detect a temperature of the fixing device; and
   a motor driving current controller configured to control the motor driving current to increase the motor driving current at a predetermined rate when the temperature of the fixing device which is detected by the temperature sensor is lower than a predetermined temperature.

2. The image forming apparatus according to claim 1, wherein the temperature sensor is configured to detect a temperature level at which the toner image can be fixed to the to-be-fixed material.

3. The image forming apparatus according to claim 1, wherein the condition detecting mechanism includes a counter configured to count a time until reaching a fixable temperature is detected by a temperature detector.

4. The image forming apparatus according to claim 1, wherein one of the conditions is such that a result of detection by the condition detecting mechanism is a longer time than a predetermined time.

5. A motor drive methods, comprising:
   detecting an environmental temperature of a fixing device of an image forming apparatus;
   supplying a motor driving current to allow a carriage to be operated in a way suitable to an environmental temperature; and
   supplying a second motor driving current of a large level than the first motor current, to a motor, when the detected environmental temperature of the fixing device is lower than a predetermined value.

6. The motor drive method according to claim 5, wherein the second motor driving current is continuously supplied until the number of times an operation of the carriage is performed reaches a predetermined time.

7. The motor drive method according to claim 5, wherein the operation of the carriage is continuously performed for a predetermined time.

* * * * *